United States Patent

[11] 3,625,863

| [72] | Inventors | Karl-Heinz Heller<br>Moers;<br>Claus Wulff, Krefeld-Bockum, Germany;<br>Ludwig Muller, New York, N.Y. |
|---|---|---|
| [21] | Appl. No. | 856,496 |
| [22] | Filed | Sept. 9, 1969 |
| [45] | Patented | Dec. 7, 1971 |
| [73] | Assignee | Farbenfabriken Bayer Aktiengesellschaft<br>Leverkusen, Germany |
| [32] | Priority | Oct. 5, 1968 |
| [33] | | Germany |
| [31] | | P 18 01 401.2 |

[54] PROCESS FOR THE PRODUCTION OF FIXED BED OXIDATION CATALYSTS
3 Claims, No Drawings

[52] U.S. Cl.................................................. 252/437,
252/435, 252/428, 260/533 N
[51] Int. Cl......................................................... B01j 11/82
[50] Field of Search............................................ 252/437,
435, 428

[56] References Cited
UNITED STATES PATENTS

| 2,773,838 | 12/1956 | Reid et al................... | 252/437 |
| 2,773,921 | 12/1956 | Rylander et al.............. | 252/435 |
| 3,226,337 | 12/1965 | Riemenschneider et al.. | 252/437 X |
| 3,238,254 | 3/1966 | Kerr............................ | 252/437 X |

*Primary Examiner*—Patrick P. Garvin
*Attorney*—Connolly and Hutz

ABSTRACT: Producing a precipitate from an aqueous solution of a vanadium compound and a phosphoric acid compound, drying the precipitate, calcining the product, which is not yet finally moulded, at temperatures between about 300° and 650° C. in the presence of air, then grinding and finally moulding it without applying elevated temperatures.

PROCESS FOR THE PRODUCTION OF FIXED BED OXIDATION CATALYSTS

Catalysts of this type have hitherto been prepared by producing a precipitate from an aqueous solution of a phosphoric acid compound and a vanadium compound, optionally in the presence of other metal compounds, for example a copper salt, and in the presence of an inert carrier, drying the precipitate, grinding, moulding and calcining it at temperatures between about 300° and about 650° C. in the presence of oxygen (cf., e.g., U.S. Pat. No. 2,773,838, especially example 1). However, the activity of the catalysts prepared in this way, noticeably decreases within a relatively short time.

The process according to the invention for the production of fixed bed oxidation catalysts having improved properties comprises producing a precipitate from an aqueous solution of a vanadium compound and a phosphoric acid compound and optionally other metal compounds, optionally in the presence of an inert carrier, drying the precipitate and calcining the dried but not yet finally moulded product at temperatures between about 300° and about 650° C., then grinding and moulding it without applying elevated temperatures.

This moulding is expediently carried out by pressure-moulding of the calcined product, optionally with the addition of a small amount of a binding agent, for example, zinc stearate.

The catalysts prepared according to this process have a remarkable dimensional stability and remain active over a substantially longer period of time than the catalysts produced according to the conventional processes.

A particular composition of the catalysts and the details of the production of the precipitate are not important in order to achieve these comparatively improved properties, and various variations are therefore possible; but these are not essential to the invention, only the grinding and final moulding after calcination of the dried precipitate are important.

The catalysts produced according to the invention can be used, for example, for the catalytic oxidation of butene mixtures to form maleic acid.

EXAMPLE 1

A. A solution of 1.61 mol phosphoric acid in 20 mol of water is placed in a stirrer flask, 1.0 mol ammonium vanadate is introduced in portions at about 20° C., but not more than 35° C., and completely dissolved, a clear red-brown solution being formed. This solution is heated while stirring. A yellow precipitate if formed at 70°–80° C. The suspension is then concentrated until it has the consistency of a paste. The paste is dried at about 200° C. for 5 hours.

According to the invention, the product is then heated in the presence of oxygen, the temperature being raised from 200° C. to about 450° C. by about 10° C. per hour, and the temperature of 450° C. is then maintained for 16 hours. The material is then ground to a granular size of not more than 0.5 mm. and subsequently pressure-moulded with the addition of 2 parts by weight zinc stearate to produce pills of 5 mm.

These pills are placed into a reaction kiln consisting of a packet of 46 tubes surrounded by a salt bath. Each individual tube has a diameter of 24 mm. and a length of 3,000 mm. and is charged with 1,000 ml. of the catalyst.

Through this device there is then passed a hydrocarbon mixture (18 percent by weight n-butene-(1), 37 percent by weight trans-butene-(2), 21 percent by weight cis-butene-(2), 19 percent by weight n-butane, 4 percent by weight isobutane and 1 percent by weight isobutene) and air. The load per individual tube amounts to 2.8 m.$^3$ at s.t.p. of air with a content of 48 g./m.$^3$ at s.t.p. of hydrocarbon mixture per hour.

The other conditions of the experiment are given in the following table. The yield of maleic acid is determined by polarography.

| Running time as hours | Bath temperature | max. temp. of catalyst | Yield as % by weight, referred to hydrocarbon mixture |
| --- | --- | --- | --- |
| 100 | 420 | 495 | 64 |
| 500 | 415 | 495 | 66 |
| 2,000 | 415 | 495 | 65 |

B. Comparative experiment

The concentrated paste obtained according to experiment A is dried at 20° C. for 12 hours, and likewise ground to a granular size of 0.5 mm., but then pressure-moulded to form 5 mm. pills and calcinated as in experiment A.

When this catalyst is used for the preparation of maleic acid according to example A, the yield of maleic acid is still 67 percent after a running time of 30 hours, but only 59 percent already after 50 hours and only 55 percent after 200 hours.

EXAMPLE 2

A. The procedure described in example 1A is followed, but with the addition of a solution of 0.57 mol Cu(CH$_3$·CO$_2$)$_2$·H$_2$O in 425 cc. of a 25 percent concentrated ammonia solution and 5 mol of water. The mixture is again heated with stirring, whereupon a precipitate is formed. The dispersion is concentrated, dried at 210° C. for 4 hours, calcined according to example 1, ground to a granular size of not more than about 0.5 mm., and pressure-moulded to form pills of 5 mm.

When this catalyst is used for the production of maleic acid anhydride according to example 1A, the following results are obtained:

| Running time as hours | Bath temperature | max. temp. of catalyst | Yield as % by weight, referred to hydrocarbon mixture |
| --- | --- | --- | --- |
| 100 | 400 | 470 | 73 |
| 200 | 400 | 470 | 73 |
| 500 | 400 | 470 | 77 |

B. Comparative experiment

The paste prepared according to the instructions of experiment A is dried at 210° C. for 16 hours, ground, pressure-moulded to form pills and calcined.

When this catalyst is used for the production of maleic acid anhydride under the experimental conditions of experiment 2A, the yield of maleic acid anhydride amounts only to 60 percent after a running time of 10 hours and only to 52 percent after 100 hours.

We claim:

1. A process for producing a vanadium-phosphoric acid fixed bed oxidation catalyst which comprises producing a precipitate from an aqueous solution of ammonium vanadate and phosphoric acid, drying the precipitate, calcining the dried but not yet finally molded product at a temperature between about 300° and about 650° C. in the presence of air, then grinding and finally molding said product without applying elevated temperature.

2. The process of claim 1 wherein said precipitate is produced in the presence of copper acetate.

3. The process of claim 1 wherein the precipitate is produced in the presence of an inert carrier.

* * * * *